(12) United States Patent
Renilson et al.

(10) Patent No.: US 10,276,914 B2
(45) Date of Patent: Apr. 30, 2019

(54) TRANSVERSELY CLAMPABLE LINEAR ADJUSTMENT MECHANISM

(71) Applicant: CommScope Technologies LLC, Hickory, NC (US)

(72) Inventors: Ian Thomas Renilson, Fife (GB); David John Walker, Edinburgh (GB); James Michael Jefferson, Fife (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/151,437

(22) Filed: Oct. 4, 2018

(65) Prior Publication Data

US 2019/0036197 A1   Jan. 31, 2019

Related U.S. Application Data

(63) Continuation of application No. 15/507,989, filed as application No. PCT/US2014/069578 on Dec. 10, 2014, now Pat. No. 10,096,885.

(60) Provisional application No. 62/051,012, filed on Sep. 16, 2014.

(51) Int. Cl.
| | |
|---|---|
| *H01Q 1/12* | (2006.01) |
| *H01Q 3/08* | (2006.01) |
| *F16B 2/10* | (2006.01) |
| *F16M 13/02* | (2006.01) |

(52) U.S. Cl.
CPC .............. *H01Q 1/1228* (2013.01); *F16B 2/10* (2013.01); *F16M 13/022* (2013.01); *H01Q 1/125* (2013.01); *H01Q 3/08* (2013.01)

(58) Field of Classification Search
CPC ................................. H01Q 1/12; H01Q 3/08

USPC .......................................................... 343/892
See application file for complete search history.

(56) References Cited

U.S. PATENT DOCUMENTS

| 6,262,691 B1 | 7/2001 | Austin et al. | |
|---|---|---|---|
| 2011/0031360 A1* | 2/2011 | Pan ........................ | F16M 11/10 248/201 |
| 2012/0211624 A1* | 8/2012 | Lin ...................... | H01Q 1/1228 248/292.14 |

(Continued)

OTHER PUBLICATIONS

International Search Report and Written Opinion for PCT/US2014/069578 dated Jul. 11, 2015, 9 pages.

*Primary Examiner* — Andrea Lindgren Baltzell
(74) *Attorney, Agent, or Firm* — Myers Bigel, P.A.

(57) ABSTRACT

In certain embodiments, a linear adjustment mechanism includes an adjustment plate, an adjustment nut, and a holding plate. The adjustment plate has an exterior-threaded section that engages with the adjustment nut, a mounting-bolt opening, and a clamping-bolt slot. The holding plate has a horizontal section having a clamping-bolt opening, a vertical section connected to the horizontal section, and an adjustment-nut opening. With (i) the adjustment nut engaged with the adjustment-nut opening and the exterior-threaded section of the adjustment plate and (ii) the clamping bolt inserted within (a) the clamping-bolt slot of the adjustment plate and (b) the clamping-bolt opening of the holding plate, (1) rotation of the adjustment nut on the exterior-threaded section of the adjustment adjusts the linear position of the adjustment plate relative to the holding plate and (2) rotation of the clamping bolt secures the linear position of the adjustment plate relative to the holding plate.

16 Claims, 9 Drawing Sheets

(56) References Cited

U.S. PATENT DOCUMENTS

2013/0221182 A1    8/2013  Renilson et al.

* cited by examiner

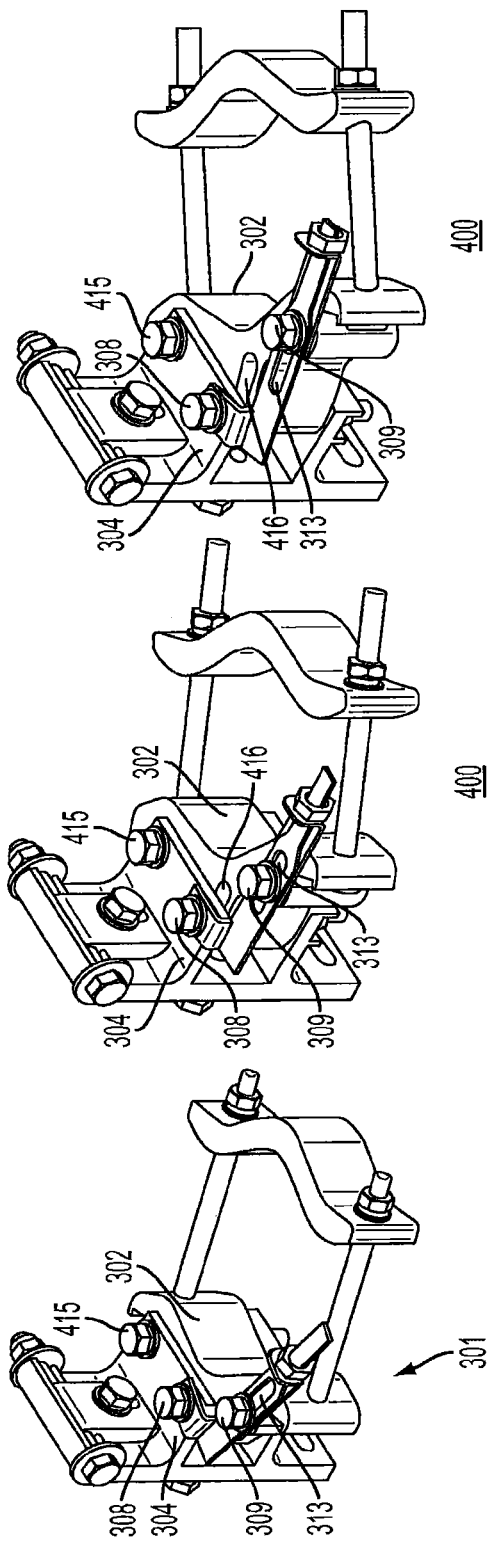

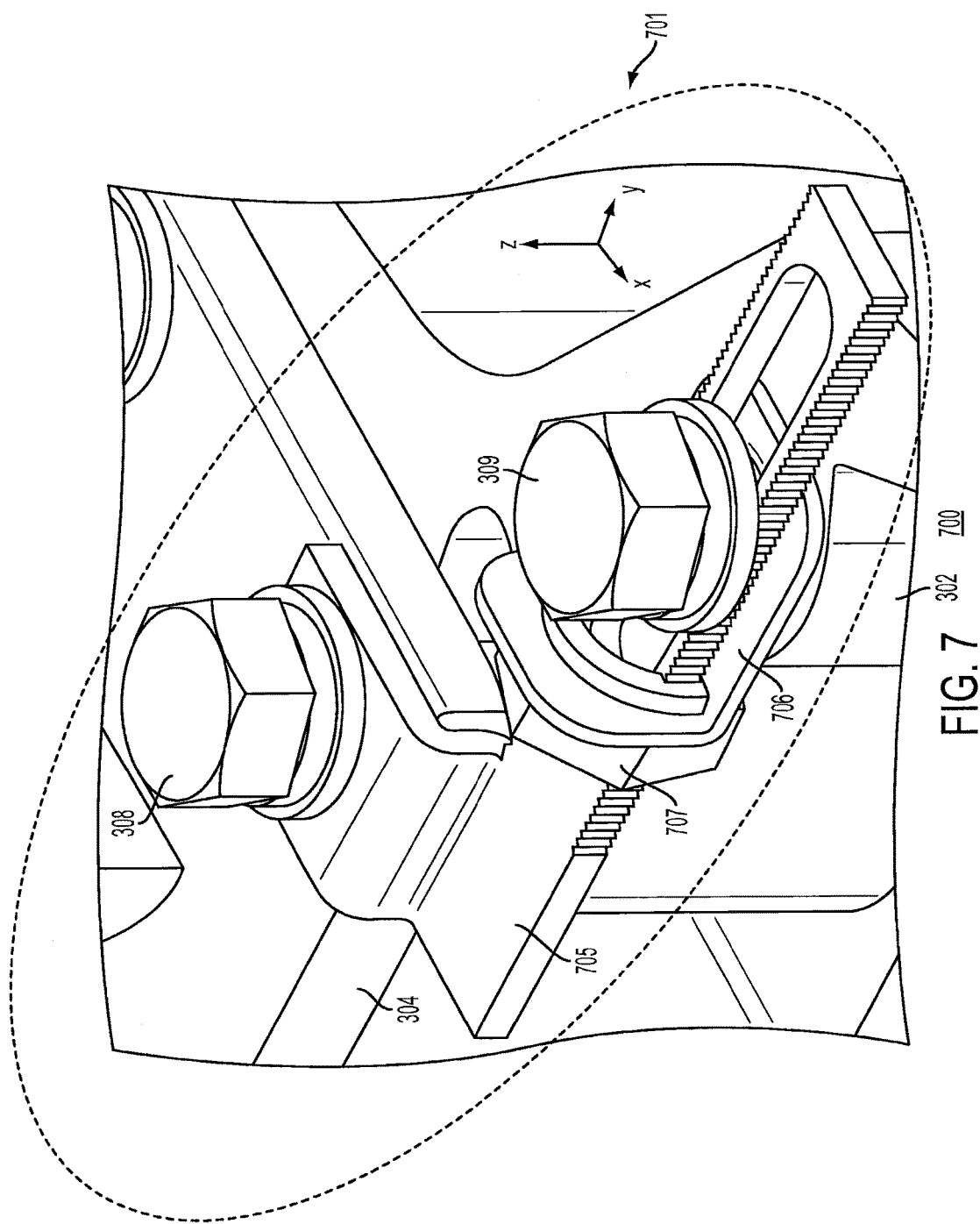

TRANSVERSELY CLAMPABLE LINEAR ADJUSTMENT MECHANISM

CROSS REFERENCE TO RELATED APPLICATIONS

This application is a continuation of U.S. application Ser. No. 15/507,989, filed on Mar. 1, 2017, which is a 35 U.S.C. § 371 national stage application of PCT International Application No. PCT/US2014/069578, filed on Dec. 10, 2014, which claims the benefit of the filing date of U.S. Provisional Application No. 62/051,012, filed on Sep. 16, 2014, the contents of which are incorporated by reference herein in their entireties.

BACKGROUND

Field

The current disclosure relates to linear adjustment mechanisms, and more specifically, but not exclusively, to such mechanisms for setting and clamping the azimuth angle of an antenna.

Description of the Related Art

Linear adjustment mechanisms are useful for setting and holding particular distances between two elements. One particular use for a linear adjustment mechanism is in mounting and aligning a directional antenna. Directional microwave antennas used for transmitting microwave signals need to be aligned so that the boresights of two such antennas overlap. In other words, the boresights of the two antennas need to be collinear for more efficient transmission. Since the distance—known as the hop distance—between two microwave transmission antennas is typically many—often dozens or scores of—miles, the alignment of the antennas needs to be precise.

FIGS. 1A-1B show a top view and a perspective view, respectively, of a conventional antenna mount 100 that uses conventional linear adjustment mechanisms. Antenna mount 100 may be mounted on a vertical pole (not shown) located between pivot base 101 and mounting bracket 102. The azimuth angle of an antenna (not shown) mounted on antenna mount 100 corresponds to the azimuth angle of mounting plate 103, whose azimuth angle may be adjusted using the mount's linear adjustment mechanisms. Note that, typically, coarse adjustments of the azimuth angle are performed by rotating antenna mount 100 about the mounting pole. Once the coarse adjustment is complete, antenna mount 100 is securely clamped to the pole between mounting bracket 102 and pivot base 101. Fine adjustments of the azimuth angle of mounting plate 103 are then performed using the linear adjustment mechanisms described below.

A first linear adjustment mechanism includes threaded extension bolt 104, concave washers 105, and nuts 106. A second linear adjustment mechanism includes corresponding elements on the other side of antenna mount 100. Although the azimuth angle of antenna mount 100 is adjusted and secured using both linear adjustment mechanisms, the following discussion describes the operation of the first linear adjustment mechanism. The second linear adjustment mechanism operates in an analogous manner.

By adjusting the location of nuts 106 along extension bolt 104, the distance between pivot bolt 107—which is connected to mounting plate 103 via elevation plate 108—and the end 109 of pivot base 101 may be varied. Since one rotation of nut 106 moves nut 106 transversely a distance equal to the pitch of the internal threading of nut 106—which corresponds to the external threading of extension bolt 104—the fineness of the linear adjustment correlates to the fineness of the threading of nut 106 and extension bolt 104.

Varying the distance between bolt 107 and the end 109 of pivot base 101 causes mounting plate 103 to pivot about pivot bolt 110, which, in turn, adjusts the azimuth angle of antenna mounting plate 103. The direction of adjustment for the nuts 106—in other words, the direction in which the nuts move when they are turned—is along the longitudinal axis of extension bolt 104, which is the same as the direction of tightening for the nuts 106. As a result, tightening nuts 106 may cause unintended displacement of the mounting plate 103 and, consequently, of the azimuth angle of the attached antenna. This means that, after the antenna's azimuth angle has been precisely adjusted, the antenna may lose precise boresight alignment because of the tightening of nuts 106 and, consequently, reduce transmission efficiency.

SUMMARY

One embodiment of the disclosure can be a linear adjustment mechanism comprising an adjustment plate, an adjustment nut, and a holding plate. The adjustment plate comprises an exterior-threaded section that engages with the adjustment nut, a mounting-bolt opening that receives a mounting bolt, and a clamping-bolt slot that receives a clamping bolt. The holding plate comprises a horizontal section having a clamping-bolt opening that receives the clamping bolt and a vertical section connected to the horizontal section. The holding plate has an adjustment-nut opening that receives the adjustment nut. The holding plate engages with the adjustment nut such that, with (i) the adjustment nut also engaged with the exterior-threaded section of the adjustment plate and (ii) the clamping bolt inserted within (a) the clamping-bolt slot of the adjustment plate and (b) the clamping-bolt opening of the holding plate, rotation of the adjustment nut on the exterior-threaded section of the adjustment plate adjusts the linear position of the adjustment plate relative to the holding plate and rotation of the clamping bolt secures the linear position of the adjustment plate relative to the holding plate.

BRIEF DESCRIPTION OF THE DRAWINGS

Other embodiments of the invention will become apparent. In the accompanying drawings, like reference numerals identify similar or identical elements.

FIGS. 4A-4C show perspective views of a portion of the antenna mount of FIG. 3 that comprises the transversely clampable, linear adjustment mechanism of FIG. 3 in a first, second, and third azimuth-adjustment position.

FIG. 7 shows a perspective view of a transversely clampable, linear adjustment mechanism in an antenna system in accordance with an alternative embodiment of the present disclosure.

DETAILED DESCRIPTION

A transversely clampable, linear adjustment mechanism that allows for precise linear adjustment in a first direction and clamping in a transverse, second direction may provide for position-holding that would not unintentionally disturb the precise linear adjustment. Such a transversely clampable, linear-adjustment mechanism may be useful for azimuth adjustment in antenna mounts.

Figure 1A:
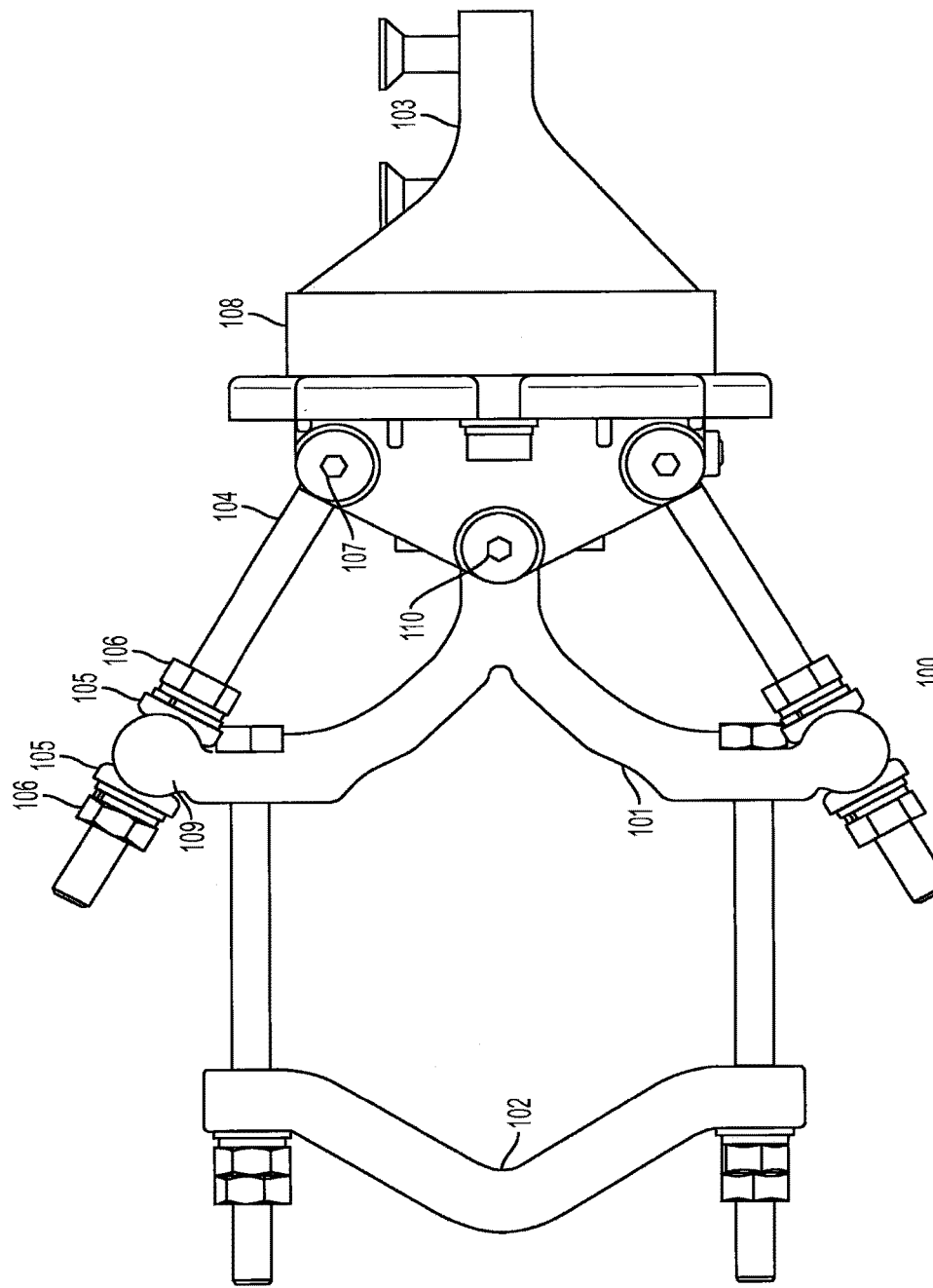
FIGS. 1A-1B show a top view and a perspective view of a conventional antenna mount that uses conventional linear adjustment mechanisms.
Figure 1B:
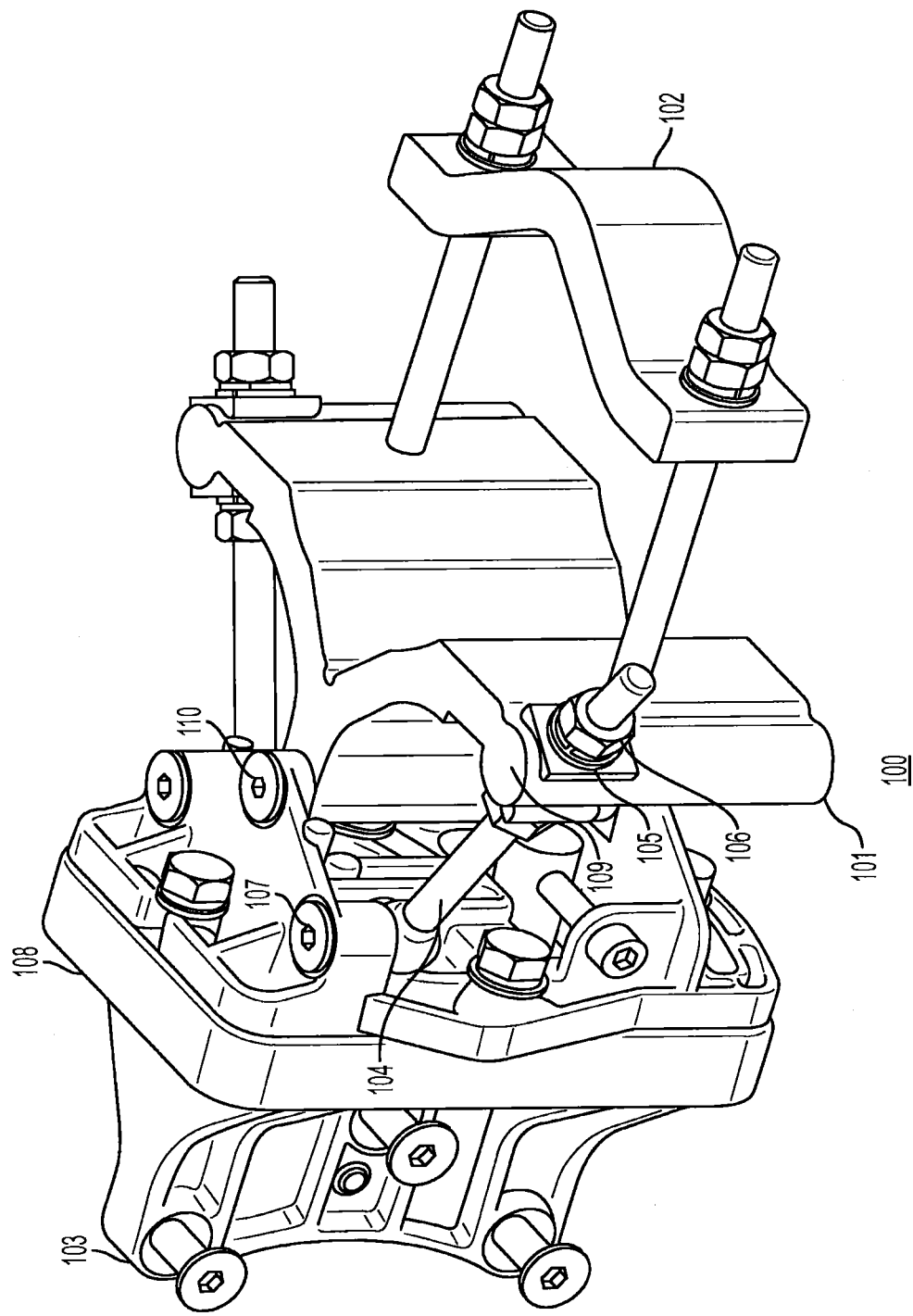
Figure 2:
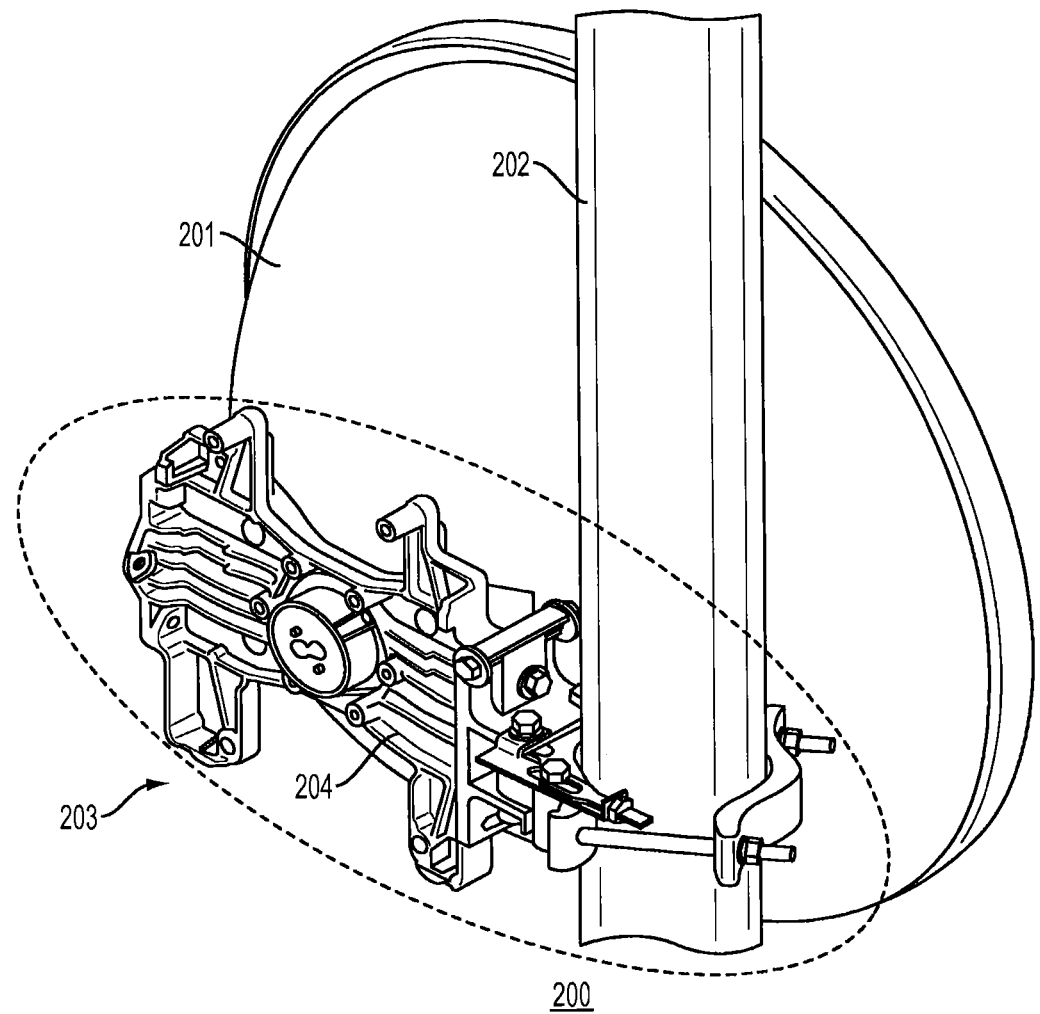
FIG. 2 shows a perspective view of an antenna system in accordance with one embodiment of the present disclosure.

FIG. 2 shows a perspective view of antenna system 200, which comprises antenna 201 mounted onto pole 202 using antenna mount 203 in accordance with one embodiment of the present disclosure. Antenna mount 203 includes mounting plate 204.

Figure 3:
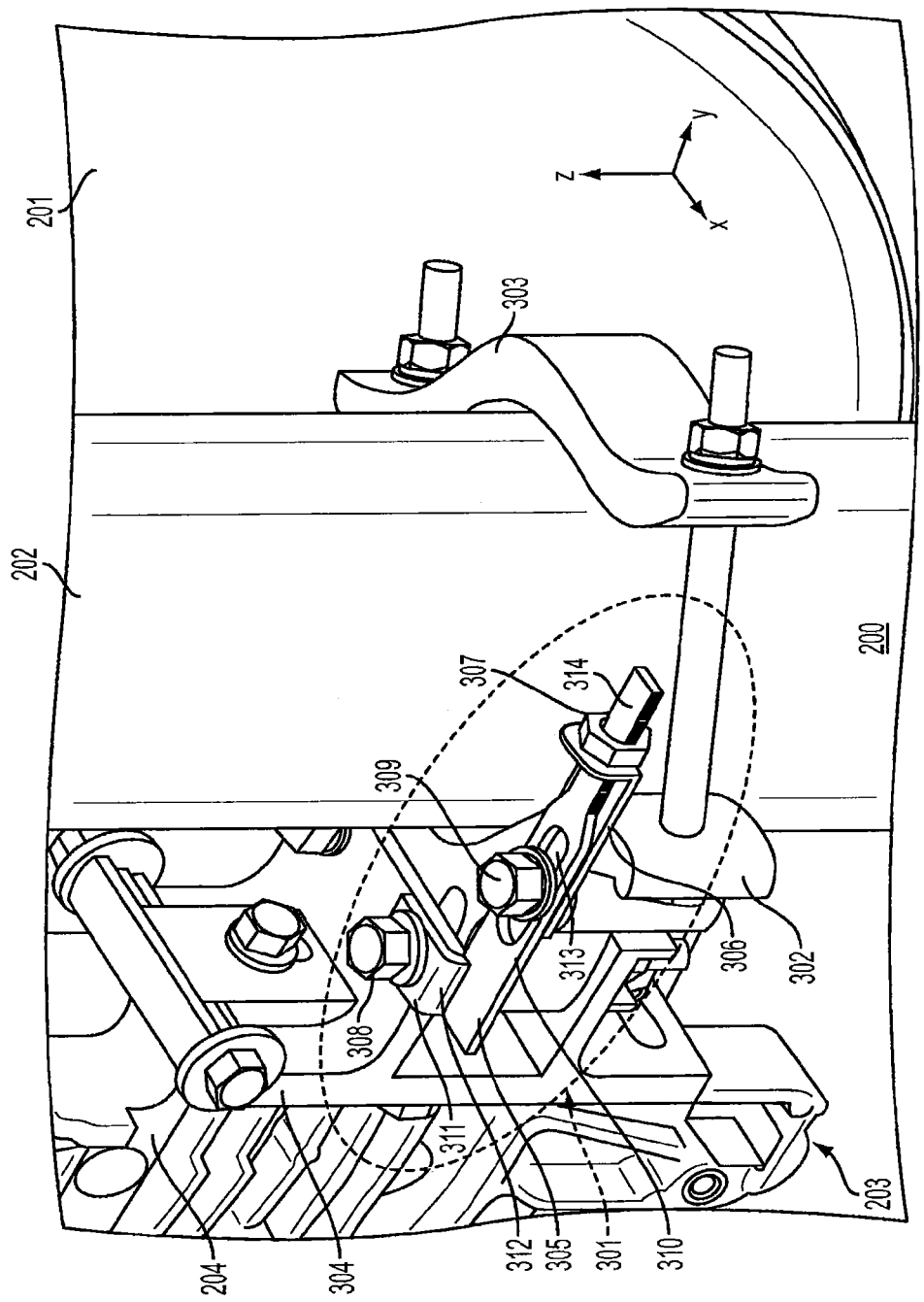
FIG. 3 shows a partial perspective view of the antenna system of FIG. 2.

FIG. 3 shows a partial perspective view of antenna system 200 of FIG. 2, including portions of antenna 201, pole 202, and antenna mount 203. FIG. 3 includes exemplary orthogonal axes to assist in the description. Antenna mount 203 includes transversely clampable, linear adjustment mechanism 301, pivot base 302, mounting bracket 303, mounting base 304, and mounting plate 204. Mounting base 304 connects to the mounting plate 204 on which antenna 201 is mounted. As explained in more detail below, adjustment mechanism 301 allows for the precise setting and then holding of an azimuth angle for antenna 201 relative to pole 202.

Transversely clampable, linear adjustment mechanism 301 includes adjustment plate 305, holding plate 306, and adjustment nut 307, which are adapted to work with, among others, mounting bolt 308 and clamping bolt 309. Linear adjustment mechanism 301 is used to set and hold a precise distance between mounting bolt 308 and threaded clamping bolt 309, which engages threading in a tapped opening (not shown) in pivot base 302. Mounting bolt 308, which is inserted through a mounting-bolt opening (not shown) in the adjustment plate 305, bolts the adjustment plate 305 to the mounting base 304 so that the adjustment plate 305 is rigidly attached to the mounting base 304.

Adjustment plate 305 includes an elongated base section 310 connected to adjacent mounting section 311 via a two-elbowed step section 312. Step section 312 accounts for the particular height differences between the section of the pivot base 302 where clamping bolt 309 bolts and the section of mounting base 304 where mounting bolt 308 bolts. Mounting section 311 includes a mounting-bolt opening (not visible in FIG. 3) for receiving mounting bolt 308, which is used to clamp the adjustment plate 305 to the mounting base 304.

Base section 310 includes an elongated clamping-bolt slot 313 through which clamping bolt 309 may clamp adjustment plate 305 and holding plate 306 to pivot base 302. Adjustment plate 305 has a first axis, corresponding to the y axis, along which it is linearly adjustable in relation to clamping bolt 309. The diameter of clamping bolt 309 corresponds to the width of clamping-bolt slot 313 along the x axis, so that the clamping bolt 309 may be located anywhere along the first axis of the clamping-bolt slot 313 without displacement in a perpendicular direction, along the x axis.

Exterior portions of base section 310—specifically, along the elongated non-slotted surfaces, which are parallel to the yz plane—have threading that corresponds to the interior threading of the adjustment nut 307, whose threading is substantially helical. The exterior threading on base section 310 is located only on a threaded segment 314, which is narrower than the non-threaded segment of base section 310, which helps reduce the size of adjustment nut 307 and holding plate 306.

Adjustment plate 305 may be formed from a segment of sheet metal that is stamped to form its outline and openings, machined to form the exterior threading, and pressed to form step section 312. The threading of the adjustment plate 305 may also be the result of, for example, etching, punching, pressing, casting, 3D-printing, or other manufacturing process. Adjustment plate 305 may be formed by separately forming and then joining adjacent mounting section 311 and base section 310, which may be formed by appropriate grinding, etching, machining, or similar processing of a cylindrical leadscrew into a substantially flat strip.

The threads of adjustment plate 305 may comprise helical segments or may instead be straight-line approximations of helical segments. The straight-line approximations may be at an angle to the z axis so as to approximate the helical segments or may be parallel to the z axis for simpler manufacture. The exterior threading on the adjustment plate 305 sufficiently corresponds to the interior threading of the adjustment nut 307 so that rotation of the adjustment nut 307 causes the adjustment nut 307 to move linearly along the first axis.

Holding plate 306 has a clamping-bolt opening (not visible in FIG. 3) through which clamping bolt 309 is inserted and whose diameter is such that when clamping bolt 309 is inserted, holding plate 306 is not movable along the x and y axes relative to clamping bolt 309. Before clamping bolt 309 is tightened into pivot base 302, adjustment plate 305 may move relative to holding plate 306 and clamping bolt 309 along the y axis. Specifically, turning the adjustment nut 307 linearly adjusts the position of the threaded adjustment plate 305 along the y axis and in relation to the holding plate 306. Consequently, if adjustment nut 307 is rotated in a first direction, then the distance between clamping bolt 309 and mounting bolt 308 increases, and, if adjustment nut 307 is rotated in the opposite direction, then the distance between clamping bolt 309 and mounting bolt 308 decreases.

Once the desired position of the adjustment plate 305 relative to the holding plate 306 is achieved, the clamping bolt 309 is tightened to clamp the two plates together and to the pivot base 302. Since the direction of the clamping force of the clamping bolt 309—which is along the z axis—is perpendicular to the adjustment direction of the adjustment plate 305—which is along they axis—the clamping of clamping bolt 309 will not move the adjustment plate 305 along the y axis, and the precise relative position of the adjustment plate 305 to the holding plate 306 will not change due to the clamping operation. Consequently, the distance between the mounting bolt 308 and the clamping bolt 309—which determines the azimuth angle of antenna 201— will also not change due to the clamping operation of clamping bolt 309.

FIGS. 4A-4C show perspective views of portion 400 of antenna mount 203 of FIG. 3 that comprises transversely clampable, linear adjustment mechanism 301 of FIG. 3 in a first, second, and third azimuth-adjustment position. FIG. 4A shows adjustment mechanism 301 in a first azimuth-adjustment position, where clamping bolt 309 is at a first end of clamping-bolt slot 313. FIG. 4B shows adjustment mechanism 301 in a second azimuth-adjustment position, different from the first azimuth-adjustment position, where clamping bolt 309 is at the center of clamping-bolt slot 313. FIG. 4C shows adjustment mechanism 301 in a third azimuth-adjustment position, different from the first and second azimuth-adjustment positions, where clamping bolt 309 is at a second end of clamping-bolt slot 313, opposite from the first end.

Portion 400 includes a second mounting bolt 415 located on the other side of pivot base 302 from mounting bolt 308. Pivot base 302 includes a curved slot 416 adapted to accept mounting bolt 308. Mounting bolt 308 slides within slot 416 as mounting base 304 is rotated about mounting bolt 415. FIGS. 4A-4C show mounting bolt 308 in first, second, and third, respectively, positions within slot 416.

Figures 5A, 5B, 5C, 5D:
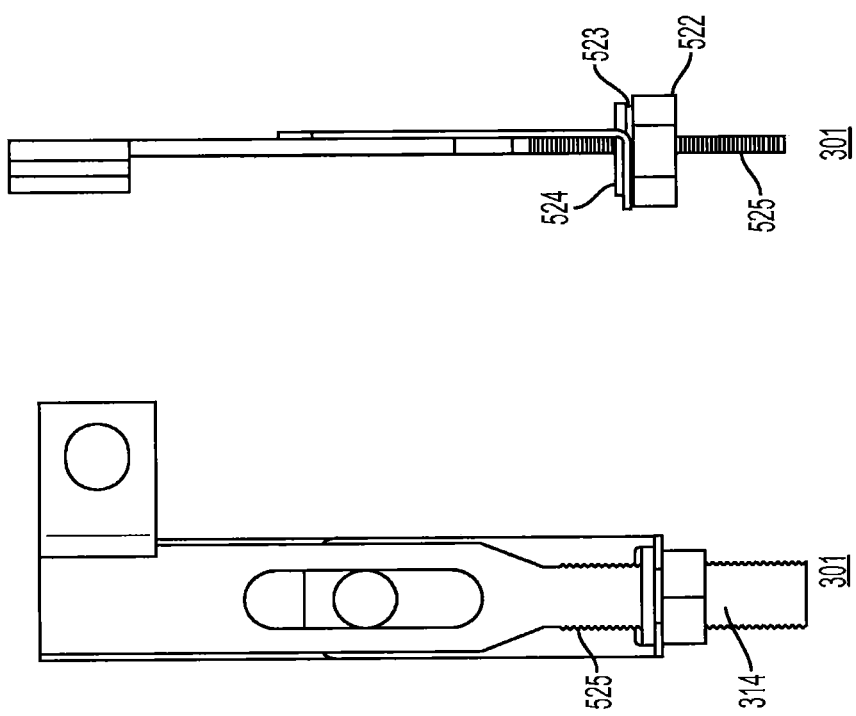
FIGS. 5A-5D, respectively, show three orthogonal views and one perspective view of the transversely clampable, linear adjustment mechanism of FIG. 3.
Figures 6A, 6B, 6C:
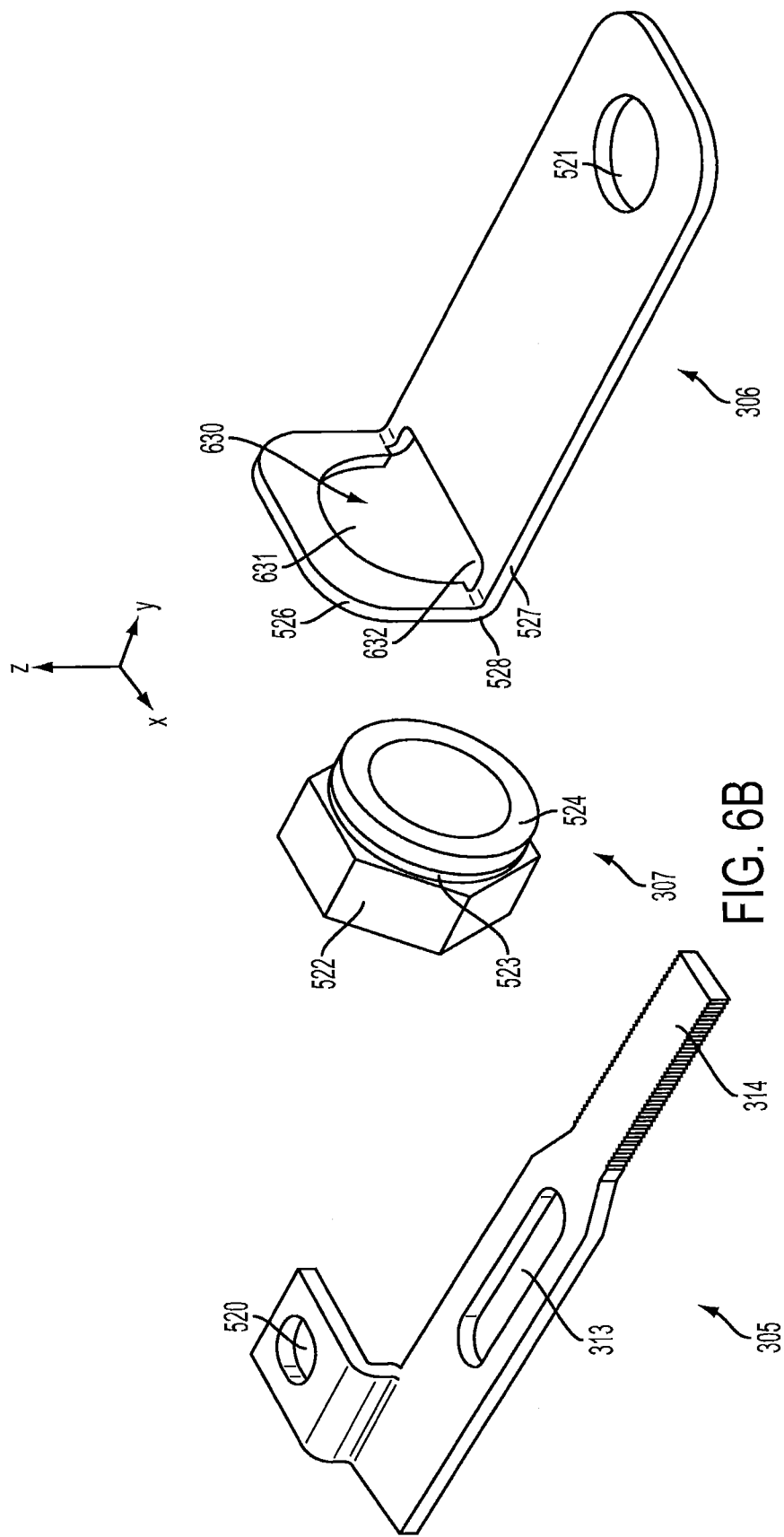
FIGS. 6A-6C, respectively, show perspective views of the adjustment plate, adjustment nut, and holding plate of the adjustment mechanism of FIG. 3.

FIGS. 5A-5D, respectively, show three orthogonal views and one perspective view of transversely clampable linear adjustment mechanism 301 of FIG. 3. FIGS. 6A-6C, respectively, show perspective views of adjustment plate 305, adjustment nut 307, and holding plate 306 of adjustment mechanism 301 of FIG. 3. As described above, adjustment plate 305 comprises base section 310 connected to mounting section 311 via step section 312. Mounting section 311 includes mounting-bolt opening 520, which allows mounting bolt 308 of FIG. 3 to fasten the adjustment plate 305 to mounting base 304. Base section 310 includes clamping-bolt slot 313 and holding plate 306 has clamping-bolt opening 521, which allow clamping bolt 309 to clamp adjustment plate 305 to holding plate 306 and to pivot base 302.

Adjustment nut 307 has a hexagonal base section 522 topped by cylindrical holding neck 523 that is topped by a concentric cylindrical crown 524 that is wider than holding neck 523. Base section 522 is for turning adjustment nut 307 in order to move it linearly along threaded segment 314 of adjustment plate 305, which comprises threading 525. Holding neck 523 and crown 524 are for securing adjustment nut 307 to holding plate 306 so that rotating adjustment nut 307 does not cause linear displacement of adjustment nut 307 relative to holding plate 306. In other words, holding neck 523 and crown 524 enable adjustment nut 307 to push as well as pull adjustment plate 305 relative to holding plate 306. Note that when adjustment nut 307 is engaged with holding plate 306, base section 522 is on one side of vertical section 526 of holding plate 306 while crown 524 is on the other side of vertical section 526.

Holding plate 306 is an L-plate with a horizontal section 527 that is connected to the perpendicular, vertical section 526 by an elbow section 528. The vertical section 526 has adjustment-nut opening 630 that extends through the elbow section 528 to the horizontal section 527. Opening 630 has a vertical portion 631 located in vertical section 526 that is shaped substantially semi-circularly with a diameter slightly larger than that of holding neck 523 of adjustment nut 307. The thickness of vertical section 526 along the y axis is slightly smaller than the height of holding neck 523. Adjustment-nut opening 630 engages, like a partial collar, about half of the holding neck 523, as shown in FIGS. 5A and 5B. Opening 630 has a horizontal portion 632 located in horizontal section 527 that is shaped substantially rectangularly with (1) a length along the x axis corresponding to, and slightly longer than, the diameter of crown 524 of adjustment nut 307 (2) a width along the y axis corresponding to, and slightly longer, than the height along the y axis of crown 524, so that the crown 524 may be fit securely into the horizontal portion 632. Note that, as adjustment nut 307 is rotated, a different portion of holding neck 523 is engaged by holding plate 306. Note that the dimensions and outline of opening 630 are such that adjustment nut 307 may be inserted into opening 630 and be securely held there. Holding plate 306 may be formed by, for example, bending an appropriately shaped and punched metal sheet.

Figure 8C:
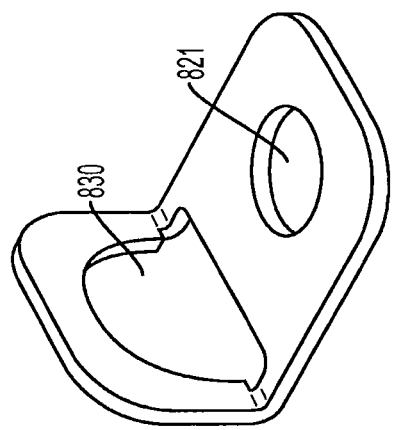
FIGS. 8A-8C respectively show perspective views of the adjustment plate, the adjustment nut, and the holding plate of the transversely clampable, linear adjustment mechanism of FIG. 7.
Figure 8B:
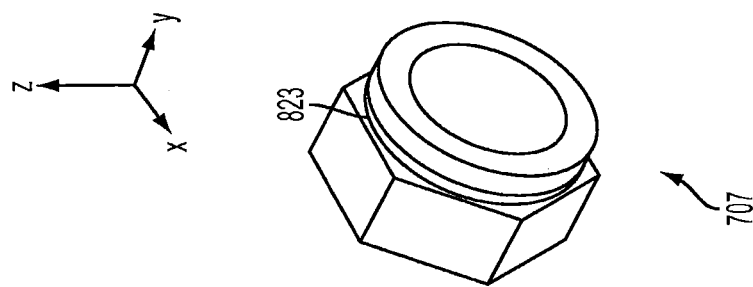
Figure 8A:
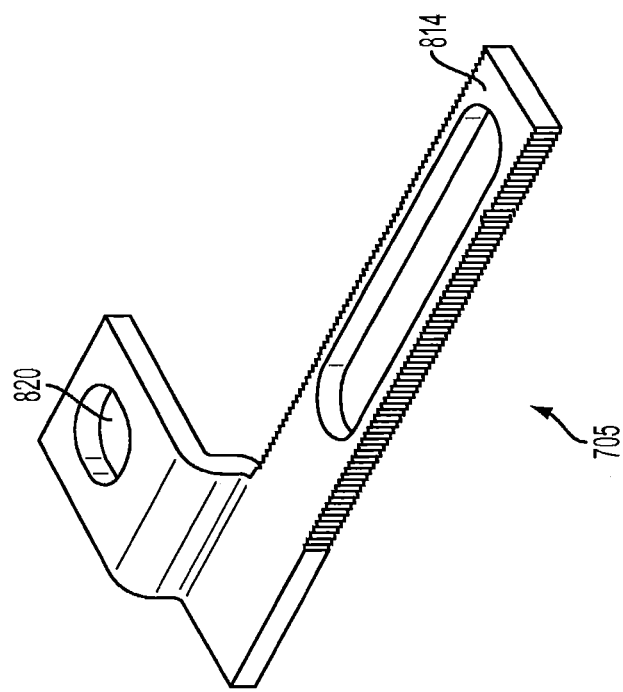

FIG. 7 shows a perspective view of a transversely clampable, linear adjustment mechanism 701 in antenna system 700 in accordance with an alternative embodiment of the present disclosure. FIGS. 8A-8C, respectively, show perspective views of adjustment plate 705, adjustment nut 707, and holding plate 706 of transversely clampable, linear adjustment mechanism 701 of FIG. 7. Antenna system 700 is substantially similar to antenna system 200 of FIG. 2 and similar components are similarly labeled. Adjustment mechanism 701 comprises adjustment plate 705, holding plate 706, and adjustment nut 707. Adjustment plate 705 is bolted to mounting base 304 by mounting bolt 308. Adjustment plate 705 and holding plate 706 are bolted to pivot base 302 by clamping bolt 309. Compared to adjustment mechanism 301 of FIG. 3, the orientation of holding plate 706 and adjustment nut 707 in relation to adjustment plate 705 are reversed.

Adjustment plate 705 includes mounting-bolt opening 820 for receiving mounting bolt 308. Adjustment nut 707 is substantially similar to adjustment nut 307 of FIG. 6B. Holding plate 706 is substantially similar to holding plate 306 of FIG. 6C and comprises clamping-bolt opening 821 for receiving clamping bolt 309 and adjustment-nut opening 830 for receiving the threaded section 814 of adjustment plate 705 and the neck 823 of adjustment nut 707.

Embodiments have been described where the mounting-bolt opening (e.g., 520) is on an adjacent mounting section (e.g., 311) that is on one side of an elongated base section (e.g., 310) of the adjustment plate (e.g., 305 of FIGS. 5A-6C). The invention, however, is not so limited. In alternative embodiments, the mounting-bolt opening may be on the elongated base section or on an adjacent section that is attached to the base section at a different location, different angle, and/or different elevation than the adjacent mounting sections described above.

Embodiments have been described where the adjustment nut comprises a holding neck and a crown. The invention, however, is not so limited. In some alternative embodiments, the adjustment nut does not have a crown. In some other embodiments, the adjustment nut is a regular nut with only a base section and neither a holding neck nor a crown. In some of these alternative embodiments, it may be necessary to press the adjustment nut against the first section of the holding plate to ensure consistent distances between the mounting bolt and the clamping bolt.

Embodiments have been described where the adjustment nut engages the holding plate by means of a collar on the holding plate collaring a neck on the adjustment nut. The invention, however, is not so limited. In some alternative embodiments, other means are used to fasten the adjustment nut to the holding plate.

Embodiments have been described where the holding plate comprises a vertical section having an opening and connected to the horizontal section. The invention, however, is not so limited. In some alternative embodiments, the holding plate comprises a horizontal section and a feature to locate the adjustment nut, where the feature is not a vertical section having an opening. In some embodiments, the holding plate comprises a horizontal section with lugs for locating the adjustment nut. In some embodiments, the holding plate comprises a horizontal section with a cut-out that fits around a corresponding section of the neck and crown of the adjustment nut to locate the adjustment nut.

Embodiments have been described where the base section of the adjustment nut is hexagonal. The invention, however, is not so limited. In some alternative embodiments, the base section is not hexagonal and may instead be, for example, circular with longitudinal ridges around its circumference, rectangular or other-polygon shaped.

Embodiments have been described where the adjacent mounting section of the adjustment plate is connected to the base section by a step section. The invention, however, is not so limited. In some alternative embodiments, the mounting section is directly connected to the base section without the use of a step section. In these alternative embodiments, the mounting section and base section are co-planar.

Embodiments have been described where the adjustment plate comprises a base section and a mounting section. The invention, however, is not so limited. In some alternative embodiments, the adjustment plate comprises a single unitary strip having a mounting-bolt opening and an elongated clamping-bolt slot, as well as external threading corresponding to the internal threading of an adjustment nut.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

| Component List | |
|---|---|
| adjacent mounting section | 311 |
| adjustment mechanism | 701 |
| adjustment nut | 307 |
| adjustment nut | 707 |
| adjustment plate | 305 |
| adjustment plate | 705 |
| adjustment-nut opening | 830 |
| adjustment-nut opening | 630 |
| antenna | 201 |
| antenna mount | 203 |
| antenna system | 200 |
| antenna system | 700 |
| base section | 522 |
| clamping bolt | 309 |
| clamping-bolt opening | 821 |
| clamping-bolt opening | 521 |
| clamping-bolt slot | 313 |
| crown | 524 |
| curved slot | 416 |
| elbow section | 528 |
| elongated base section | 310 |
| holding neck | 523 |
| holding neck | 823 |
| holding plate | 306 |
| holding plate | 706 |
| horizontal portion | 632 |
| horizontal section | 527 |
| mounting base | 304 |
| mounting bolt | 308 |
| mounting bracket | 303 |
| mounting plate | 204 |
| mounting-bolt opening | 820 |
| mounting-bolt opening | 520 |
| pivot base | 302 |
| pole | 202 |
| second mounting bolt | 415 |
| step section | 312 |
| threaded segment | 314 |
| threaded segment | 814 |
| threading | 525 |
| transversely clampable linear adjustment mechanism | 301 |
| vertical portion | 631 |
| vertical section | 526 |

What is claimed is:

1. A method comprising:
   threading an adjustment nut onto an exterior-threaded section of an adjustment plate;
   engaging the adjustment nut with a holding plate;
   inserting a clamping bolt within a clamping-bolt slot of the adjustment plate and a clamping-bolt opening of the holding plate;
   adjusting a linear position of the adjustment plate relative to the holding plate by rotating the adjustment nut on the exterior-threaded section of the adjustment plate; and
   securing the linear position of the adjustment plate relative to the holding plate by rotating the clamping bolt.

2. The method of claim 1, wherein rotating the clamping bolt does not change the linear position of the adjustment plate relative to the holding plate.

3. The method of claim 1, wherein a direction of rotation of the adjustment nut on the exterior-threaded section of the adjustment plate is orthogonal to a direction of insertion of the clamping bolt within the clamping-bolt slot of the adjustment plate and the clamping-bolt opening of the holding plate.

4. The method of claim 1, wherein the clamping-bolt slot of the adjustment plate is dimensioned to be larger than the clamping-bolt opening of the holding plate.

5. The method of claim 1, further comprising:
mounting the adjustment plate to an antenna mount.

6. A system comprising:
an adjustment plate comprising a mounting section, and an elongated base section having a threaded portion; and
a holding plate comprising a first section and a second section that is perpendicular to the first section,
wherein the elongated base section and the first section extend in a first direction,
wherein the mounting section extends in a second direction that is perpendicular to the first section;
wherein the first section of the holding plate comprises a clamping-bolt opening, and
wherein the elongated base section comprises a clamping-bolt slot that overlaps the clamping-bolt opening.

7. The system of claim 6, wherein the elongated base section and the mounting section are at different elevations, and wherein the elongated base section is connected to the mounting section by a step section.

8. The system of claim 6, wherein the elongated base section further comprises a non-threaded portion, and wherein the threaded portion is narrower than the non-threaded portion.

9. The system of claim 6, wherein the second section of the holding plate comprises an opening dimensioned to receive at least a portion of a crown of an adjustment nut threaded onto the threaded portion of the elongated base section.

10. The system of claim 6, wherein the first section of the holding plate and the second section of the holding plate have a common opening dimensioned to receive at least a portion of an adjustment nut threaded onto the threaded portion of the elongated base section.

11. The system of claim 10, wherein the adjustment nut comprises a base section adjacent a cylindrical holding neck that is adjacent a concentric cylindrical crown, wherein the concentric cylindrical crown is wider than the cylindrical holding neck, and wherein the common opening of the first and second sections of the holding plate receive the adjustment nut such that the second section of the holding plate engages the cylindrical holding neck of the adjustment nut, and such that the base section of the adjustment nut is located on a first side of the second section of the holding plate while the concentric cylindrical crown is located on a second side of the second section of the holding plate that is opposite the first side.

12. A system comprising:
first and second mounting bolts;
a clamping bolt different from the first and second mounting bolts;
an antenna mount comprising a mounting base having first and second openings that are dimensioned to receive the first and second mounting bolts, respectively;
a pivot base having a curved slot that is dimensioned to receive the first mounting bolt, an opening that is dimensioned to receive the second mounting bolt, and an opening that is dimensioned to receive the clamping bolt;
an adjustment plate comprising a mounting section having a mounting-bolt opening that is dimensioned to receive the first mounting bolt, wherein the adjustment plate further comprises an elongated base section having a clamping-bolt slot that is dimensioned to receive the clamping bolt; and
a holding plate comprising a clamping-bolt opening dimensioned to receive the clamping bolt.

13. The system of claim 12, wherein the elongated base section and the mounting section are at different elevations, and wherein the elongated base section is connected to the mounting section by a step section.

14. The system of claim 12, wherein the elongated base section of the adjustment plate comprises a threaded portion.

15. The system of claim 14, wherein the elongated base section of the adjustment plate comprises a non-threaded portion, and wherein the mounting-bolt opening is located in the non-threaded portion of the adjustment plate.

16. The system of claim 12, further comprising an antenna rigidly attached to the antenna mount.

* * * * *